July 24, 1956  G. H. MULLER  2,755,779
POWER STEERING CYLINDER CONSTRUCTION
Filed April 13, 1953  3 Sheets-Sheet 1

G. H. MULLER
INVENTOR

BY E. C. McRae
J. R. Faulkner
J. H. Oster

ATTORNEYS

July 24, 1956  G. H. MULLER  2,755,779
POWER STEERING CYLINDER CONSTRUCTION
Filed April 13, 1953  3 Sheets-Sheet 2

LEFT TURN

G. H. MULLER
INVENTOR

BY
ATTORNEYS

July 24, 1956
G. H. MULLER
2,755,779
POWER STEERING CYLINDER CONSTRUCTION
Filed April 13, 1953
3 Sheets-Sheet 3
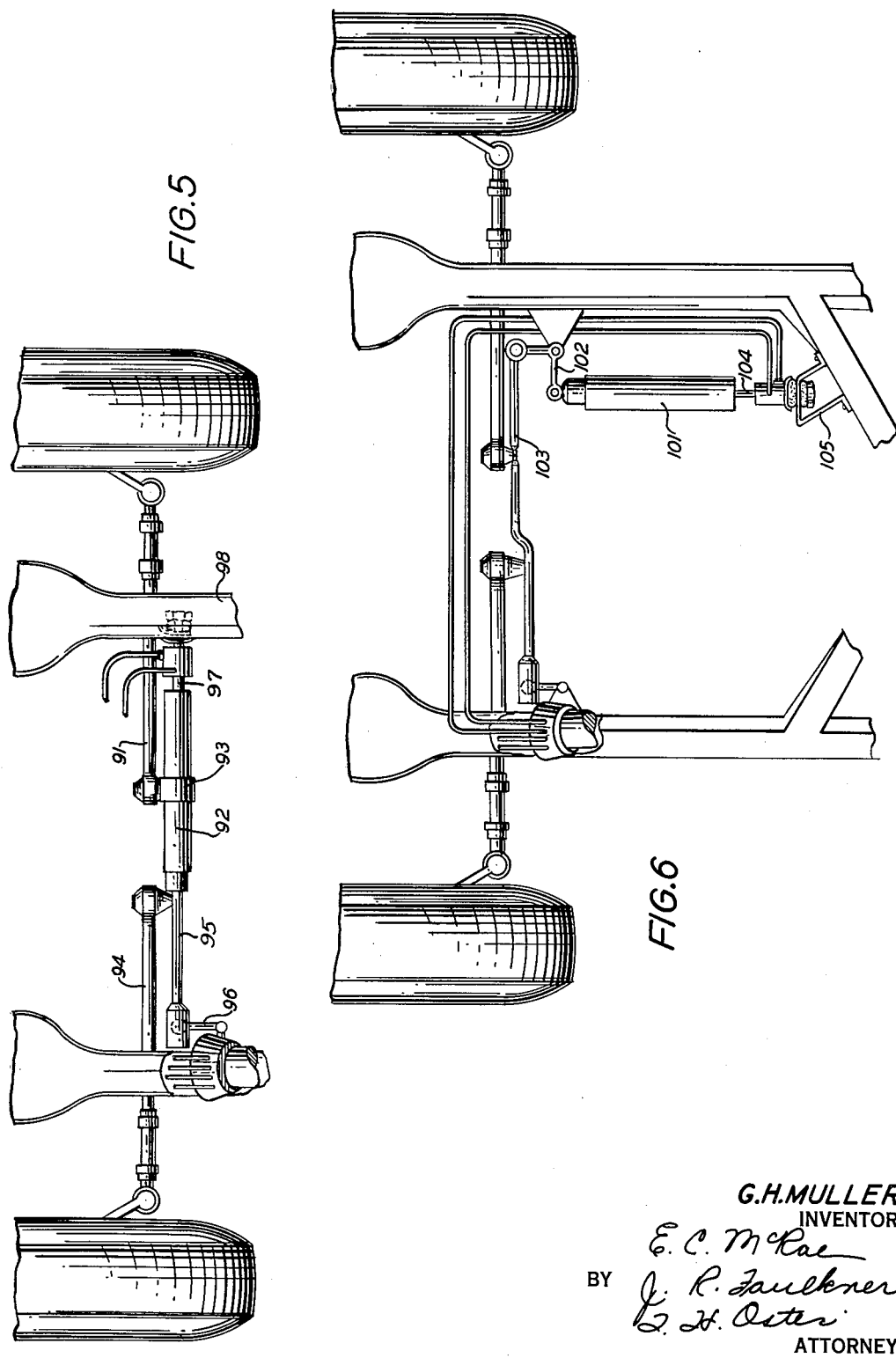
G.H.MULLER
INVENTOR
BY E. C. McRae
J. R. Faulkner
G. H. Oster
ATTORNEYS

United States Patent Office 2,755,779
Patented July 24, 1956

2,755,779

POWER STEERING CYLINDER CONSTRUCTION

George H. Muller, Northville, Mich., assignor to Ford Motor Company, Dearborn, Mich., a corporation of Delaware Application April 13, 1953, Serial No. 348,525

6 Claims. (Cl. 121—41)

This invention relates generally to power steering mechanisms, and has particular reference to the cylinder and piston construction of a power steering unit for a motor vehicle.

This invention is particularly adapted for use in connection with power steering mechanism of a booster type in which a cylinder and piston assembly is connected between a stationary frame member and a movable steering member forming part of the steering linkage, although it may also be used in connection with other types of power steering systems. A sectional floating type piston is provided for the power steering cylinder and is arranged to automatically provide communication between the cylinder on opposite sides of the piston during recovery strokes while automatically blocking this communication during power strokes. In addition, the arrangement is such that a variable pressure is applied to the sealing means between the piston and cylinder so as to minimize friction and wear during recovery strokes and yet to provide efficient sealing means during power strokes. A pair of coaxial hollow piston rods are also used in the present construction to provide fluid communication to opposite ends of the cylinder and to eliminate the necessity of attaching flexible hoses to the moving cylinder.

Other objects and advantages of this invention will be made more apparent as this description proceeds, particularly when considered in connection with the accompanying drawings, in which:

Figure 5 is a semidiagrammatic plan view of a modified arrangement.

Figure 6 is a semidiagrammatic plan view of another modified arrangement.

Figure 1:
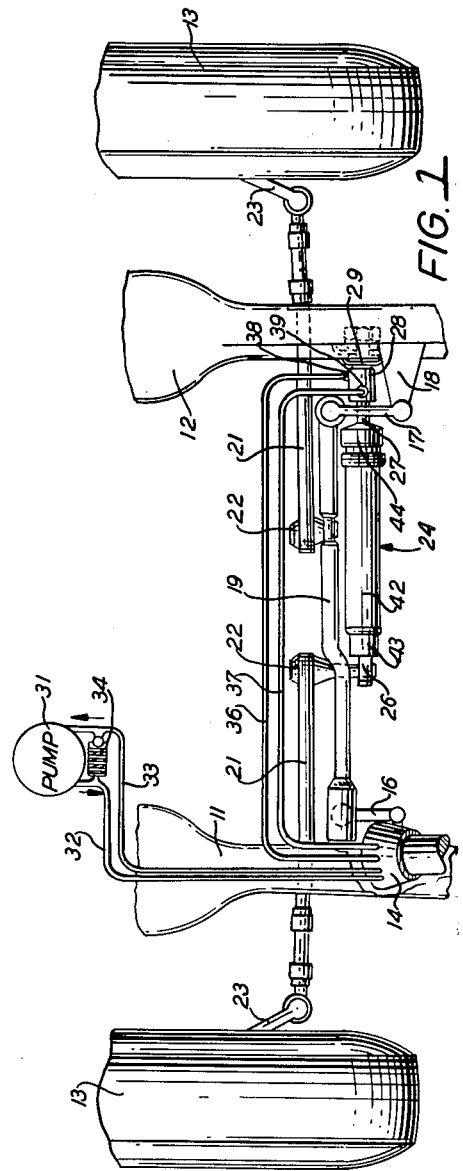
Figure 1 is a semidiagrammatic plan view of the forward portion of a motor vehicle chassis incorporating the power steering mechanism of the present invention.

Referring now to the drawings, and particularly to Figure 1, the reference characters 11 and 12 indicate the side frame members of a motor vehicle chassis, to which are connected by conventional suspension means (not shown) front steerable road wheels 13. The wheels 13 are controlled by conventional steering linkage and a manually operable steering gear. The steering gear assembly 14 is mounted upon the left side frame member 11 and actuates a pitman arm 16. Located symmetrically opposite the pitman arm 16 is an idler arm 17 pivotally connected at its rearward end to a bracket 18 carried by the right side frame member 12. A drag link 19 extends between the forward ends of the pitman arm 16 and the idler arm 17, being pivotally connected thereto. The inner ends of a pair of tie rods 21 are connected by ball joints 22 to laterally spaced intermediate points on the drag link 19, and at their outer ends the tie rods 21 are connected to steering arms 23 secured to the front road wheels 13.

To provide steering assistance to the manual steering mechanism described above, there is a provided power steering mechanism incorporating a cylinder assembly 24 to one end of which is secured an eye 26 pivotally connected to the rearward end of the connection 22 between the drag link 19 and the left tie rod 21. A piston rod assembly 27 extends from the opposite end of the cylinder 24 and is secured to a double manifold 28 which in turn is connected to a bracket 29 carried by the right side frame member 12.

Shown diagrammatically in Figure 1 is a pump 31 of any desired conventional construction. The pressure side of the pump is connected by a conduit 32 to a conventional valve mechanism housed within the steering gear assembly 14, and a return conduit 33 leads from the valve to the sump of the pump. A bypass valve 34 is interposed between the supply and return conduits 32 and 33 respectively. The valve mechanism within the steering gear assembly 14 is also connected by conduits 36 and 37 to fittings 38 and 39 in the manifold 28. The valve mechanism is of conventional construction and is operable to supply fluid under pressure from the supply conduit 32 to one of the conduits 36 and 37 when assistance is requested while at the same time connecting the other of the conduits 36 and 37 to the return line 33.

Figure 2:
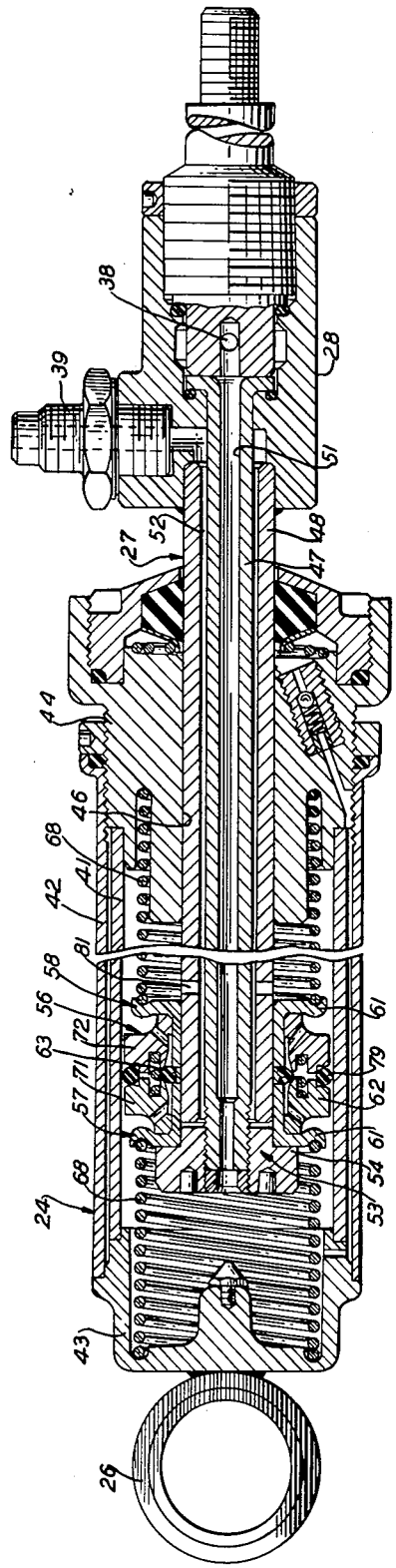
Figure 2 is an enlarged transverse cross sectional view through the cylinder and piston assembly shown in Figure 1, with the parts shown in the relative locations they assume during straight ahead manual steering without power assistance.

Referring now particularly to Figure 2, it will be seen that the cylinder assembly 24 comprises a pair of coaxial inner and outer cylinders 41 and 42 respectively. The cylinders are spaced apart and the outer cylinder 42 forms a protection for the inner cylinder. At their left hand ends the inner and outer cylinders are connected to an end cap 43 which in turn is welded to the connecting ring 26. At their right hand ends the inner and outer cylinders are connected to an elongated end cap 44 formed with a central bore 46 therethrough to reciprocably receive the piston rod assembly 27.

The piston rod assembly 27 comprises inner and outer coaxial hollow piston rods 47 and 48 respectively, each connected at their outer ends to the manifold 28. The bore 51 formed in the inner piston rod 27 communicates with the fitting 38 in the manifold and with the conduit 36, while the angular chamber 52 between the inner and outer piston rods 47 and 48 communicates with the fitting 39 in the manifold and through it to the conduit 37 leading to the valve mechanism.

The inner end of the inner piston rod 47 is threaded to receive an enlarged nut 53. The nut 53 is provided with an enlarged end flange 54 of greater diameter than the outer diameter of the outer piston rod 48 and forms an end support for the piston assembly 56. A stud 80 screwed in the nut 53 provides locking against the threaded end of the rod 47.

The piston assembly 56 includes a pair of fixed piston retainers 57 and 58 which are complimentary in shape. Each has a central hub portion 59 seated upon the outer piston rod 48, and end flanges 61. An intermediate ring 62 is positioned between the hubs 59 of the retainers 57 and 58 and is formed with a central peripheral V-shaped rib 63. The right hand piston retainer 58 is welded to the outer piston rod 48, and the left hand piston retainer 57 is held in place by the removable nut 53 to permit the disassembly of the piston.

The end flanges 61 of the fixed piston retainers 57 and 58 are formed adjacent their outer periphery with axially facing annular grooves 67 to receive the end convolutions of coil springs 68 extending between the piston retainers and the end caps 43 and 44 of the cylinder assembly. The springs 68 serve to center the cylinder relative to the piston and to assist in the recovery stroke following a power assisted steering movement between the cylinder and piston assembly.

An annular resilient sealing ring 64 having the same axial dimension as the intermediate ring 62 is seated upon the outer periphery thereof, being held against axial displacement by engagement of the V-shaped rib 63 formed on the intermediate ring with a corresponding V-shaped groove formed in the sealing ring. It will also be noted that the outer diameter of the intermediate ring 62 is slightly smaller than the outer diameter of the adjacent hubs 59 of the fixed piston retainers 57 and 58. As a result, the annular sealing ring 64 is retained between the ends of the hubs 59 of the piston retainers. The resilient annular sealing ring 64 is formed on its outer periphery with oppositely inclined faces 66.

Figure 3:
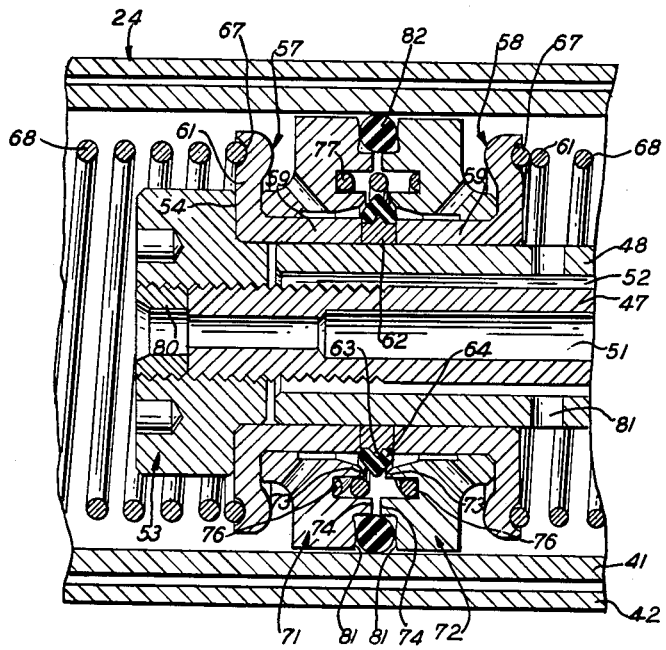
Figure 3 is a still further enlarged fragmentary cross sectional view of a portion of Figure 2.

A pair of piston sections 71 and 72 are slidably mounted upon the outer periphery of the hubs 59 of the fixed piston retainers 57 and 58. The piston sections are complimentary to each other in shape, and each is formed with a pair of axially extending annular flanges 73 and 74 forming therebetween an annular groove 76. A coil spring 77 is seated in the annular grooves 76 and normally urge the piston sections apart until they engage and are stopped by the end flanges 61 of the fixed piston retainers 57 and 58. In this position it will be noted that the radially outer axially extending annular flanges 74 formed on the piston sections are spaced axially from each other a predetermined amount. This spacing serves to determine the permitted axial movement of the piston sections toward each other during a power stroke. In addition, it will be noted that the radially inner axially extending annular flanges 73 of the piston sections are likewise spaced axially from each other and are located on opposite sides of the resilient annular sealing ring 64 carried by the intermediate fixed ring 62. In the neutral position of the piston and cylinder assemblies as shown in Figure 3, the ends of the annular flanges 73 are axially spaced from the inclined peripheral surfaces 66 of the sealing ring 64 and it will be noted that the ends of the flanges 73 are beveled to correspond to the inclined faces of the sealing ring. A restriction is thus formed between each piston section and the sealing ring 64.

Each of the piston sections is formed with an inner groove 78 with a series of inclined passageways 79 opening into the face of the piston section. It will be apparent that the passageways 79 and grooves 78 provide, in the neutral position of the piston as shown in Figure 3 in which the piston sections 71 and 72 are separated from each other, free communication through the piston assembly to permit fluid to be readily transferred from one side of the piston assembly to the other during the recovery stroke.

The piston sections 71 and 72 are formed on their inner radial faces with annular grooves 81 cooperating with each other to accommodate a resilient O-ring 82.

Figure 4:
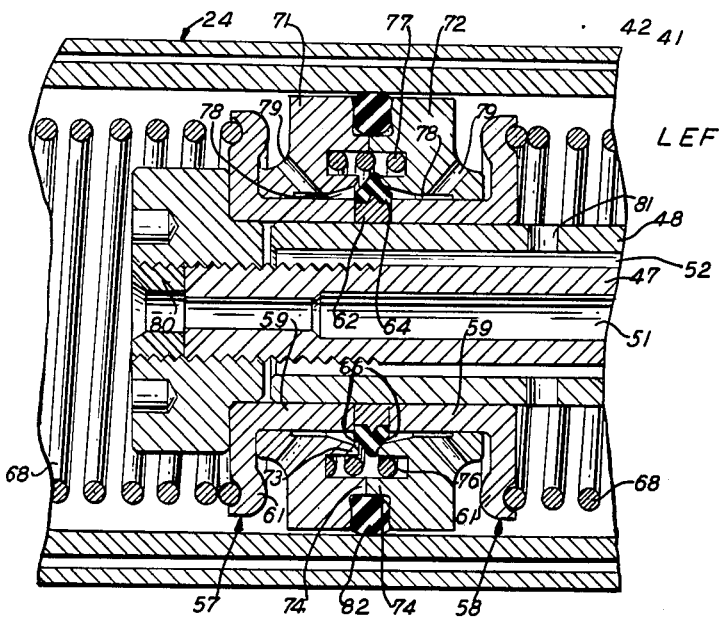
Figure 4 is a cross sectional view similar to Figure 3 but showing the relationship of the parts during a left turn under power assistance.

Reference is now made to Figure 4 which shows the relative positions of the parts of the piston assembly during a power assisted left turn. During such a turn fluid pressure from the pump 31 and the supply conduit 32 is distributed by the valve mechanism within the steering gear assembly 14 to the conduit 37 leading to the fitting 39 and thence to the chamber 52 between the inner and outer hollow piston rods 47 and 48 respectively. The fluid within this chamber is then introduced within the right hand end of the inner cylinder 41 through ports 81.

The introduction of pressure into the right hand end of the cylinder 41 immediately shifts the right hand slidable piston section 72 to the left along the hub 59 of the right hand piston retainer 58 against the action of the centering spring 77. The pressure drop through the restriction between the sealing ring 64 and the adjacent piston section 71 results in a differential pressure on opposite sides of the piston section 72, and results in moving the latter to the left. The position of the right hand piston section after this shifting movement is shown in Figure 4, and it will be noted that the radially outer annular flanges 74 now abut each other to form stops limiting the shifting movement of the right hand piston section. It will also be noted that the radially inner annular flange 73 of the right hand piston section 72 now engages and forms a seal with the adjacent inclined peripheral face 66 of the resilient sealing ring 64. Free communication through the piston assembly via the groove 78 and passageways 79 is now blocked and the pressure within the right hand end of the cylinder is thus effective to shift the cylinder assembly 24 to the right as shown in Figure 1, carrying with it the drag link 19 and the tie rods 21 to effect a left turn.

The axial shifting of the right hand piston section 72 into engagement with the annular flange 74 of the left hand piston section 71 performs a second function in that the O-ring 82 is compressed between the piston sections forcing the outer periphery of the O-ring into sealing engagement with the inner surface of the inner cylinder 41. Consequently, an efficient seal is provided between the piston assembly and the cylinder during a power stroke, while free movement of the piston within the cylinder is permitted during recovery strokes, reducing resistance to the recovery stroke as well as decreasing wear of the O-ring.

In the modification of Figure 5 the right hand tie rod 91 is directly connected to the cylinder 92 by means of a clamp 93 and the left hand tie rod 94 is directly connected to a rod 95 welded to the left hand end of the cylinder 92. The rod 95 in turn is connected to the pitman arm 96. The piston rod 97 is anchored to the frame member 98.

The modification of Figure 6 varies from the construction of Figure 1 in that the power cylinder 101 is mounted longitudinally of the vehicle and is connected at its forward end to a bell crank lever 102 which in turn is connected to the drag link 103. The rearward end of the piston rod 104 is connected to the frame bracket 105.

It will be understood that the invention is not to be limited to the exact construction shown and described, but that various changes and modifications may be made without departing from the spirit and scope of the invention, as defined in the appended claims.

What is claimed is:

1. A power steering device for a motor vehicle comprising a cylinder, a piston rod reciprocable within said cylinder, a pair of axially spaced stops on said piston rod, a pair of piston sections slidably mounted between said stops, spring means positioned between said piston sections normally urging said piston sections apart and into engagement with said stops, said piston sections having cooperating passages formed therein and communicating with each other in the separated positions of said piston sections, resilient sealing means positioned between said piston sections out of contact with both of said sections when said sections are separated and against said stops, a source of fluid pressure, and means supplying fluid pressure from said source to one end of said cylinder to move one of said piston sections against the action of said spring means into engagement with said resilient sealing means to block the passages through said piston sections and close communication between opposite ends of said cylinder.

2. The structure defined by claim 1 which is further characterized in that said piston sections each have a pair of coaxial annular flanges one of which is arranged to engage the resilient sealing means to block the communication through the piston sections between opposite ends of the cylinder and the other of which is arranged to abut the corresponding flange of the other piston section to limit the sliding movement of said one piston section.

3. The structure defined by claim 1 which is further characterized in that said resilient sealing ring comprises an annular ring mounted upon the inner end of said piston rod centrally between said stops, said piston sections being located on opposite sides of said resilient sealing ring and having aligned annular flanges in axial alignment with a portion of said sealing ring and normally spaced axially therefrom to permit fluid communication therebetween, and said piston section having aligned annular flanges spaced radially outwardly from said first mentioned annular flanges, said second mentioned annular flanges being normally spaced from each other a distance greater than the axial distance between said sealing ring and each of said first mentioned flanges so that upon axial movement of one of said piston sections said first mentioned annular flange engages the resilient sealing ring prior to engagement of the radially outer annular flange with the corresponding flange of the other piston section.

4. A power steering device for a motor vehicle comprising a cylinder, a piston rod reciprocable relative to said cylinder, a pair of axially spaced stops on the inner end of said piston rod, an annular resilient sealing ring mounted at an intermediate position between said stops, a pair of piston sections mounted for axial sliding movement between said stops, said piston sections having aligned annular flanges in axial alignment with said resilient sealing ring, spring means normally urging said piston sections apart and against said stops to space said annular flanges on opposite sides of said sealing ring to provide passages therebetween, passageways in said piston sections establishing communication between the ends of the cylinder on opposite sides of said piston sections and the openings between said annular flanges and said sealing ring to provide free communication between opposite ends of said cylinder, a second resilient sealing ring between said piston sections and engageable with said cylinder to provide a seal between said cylinder and said piston sections, a source of fluid pressure, means conducting the fluid pressure from said source to one end of said cylinder to axially move one of said piston sections against the action of said spring toward the other of said piston sections, and stop means limiting the axial movement of said last mentioned piston section but permitting the annular flange of said last mentioned piston section to engage said first mentioned annular sealing ring to provide a seal therebetween and block communication between the opposite ends of said cylinder.

5. The structure defined by claim 4 which is further characterized in that said piston sections are provided with aligned annular grooves facing each other and receiving said second mentioned sealing ring, said second mentioned sealing ring being positioned loosely in said annular grooves when said piston sections are forced apart against said stops by said spring but being compressed upon axial movement of one of said piston sections and forced into frictional sealing engagement with said cylinder.

6. The structure defined by claim 4 which is further characterized in said stops comprise complementary retaining members each having an annular hub fixedly mounted upon the inner end of said piston rod and a radially extending flange, said piston sections being slidably mounted upon said hubs and limited in axial movement by engagement with said flanges, and the stop means upon said piston sections comprise aligned annular flanges spaced radially outwardly from the first mentioned annular flanges of said piston sections and forming annular grooves in said piston section between said radially inner and outer annular flanges, said spring means being contained within said annular grooves.

References Cited in the file of this patent
UNITED STATES PATENTS

| | | |
|---|---|---|
| 2,424,233 | Greenough | July 22, 1947 |
| 2,440,794 | Bowling | May 4, 1948 |
| 2,591,118 | Bent | Apr. 1, 1952 |
| 2,608,263 | Garrison | Aug. 26, 1952 |
| 2,676,663 | Smith | Apr. 27, 1954 |